United States Patent [19]
Payne et al.

[11] 3,901,992
[45] Aug. 26, 1975

[54] FABRIC FOR CARPET AND LIKE MATERIALS CONTAINING A COATING OF COLLOIDAL SILICA WITH A LAYER OF ALUMINA

[75] Inventors: Charles C. Payne, Chicago; Richard E. Bloemke, River Grove; David P. Schaefer, Hinsdale, all of Ill.

[73] Assignee: Nalco Chemical Company, Oak Brook, Ill.

[22] Filed: Oct. 31, 1973

[21] Appl. No.: 411,549

[52] U.S. Cl. .......... 428/96; 427/372; 427/427; 428/329; 428/331; 428/446; 428/539
[51] Int. Cl.² .............. B32B 27/16; D06M 11/00
[58] Field of Search ............ 161/66; 117/139.5 CF, 138.8 N, 117/141, 169 A, 169 R

[56] References Cited
UNITED STATES PATENTS

| | | | |
|---|---|---|---|
| 2,734,834 | 2/1956 | Rainard et al. | 117/139.5 CF |
| 2,734,835 | 2/1956 | Florio et al. | 117/139.5 CF |
| 2,877,142 | 3/1959 | Rusher et al. | 117/169 R |
| 2,928,754 | 3/1960 | Schappel | 117/139.5 CF |
| 2,999,774 | 9/1961 | Schappel | 117/139.5 CF |

*Primary Examiner*—William D. Martin
*Assistant Examiner*—Sadie L. Childs
*Attorney, Agent, or Firm*—John G. Premo; John S. Roberts

[57] ABSTRACT

A synthetic fabric bulk pile carpet and like soft material having both improved antistatic and antisoil characteristics obtained by applying from about .5 to 4% $SiO_2$ based upon the dry weight of the carpet fabric pile of a silica aquasol having a coating of alumina on each silica particle, and methods of treating carpets and other soft material fabrics such as wall coverings, draperies, doormats, car upholstery and interior.

3 Claims, 1 Drawing Figure

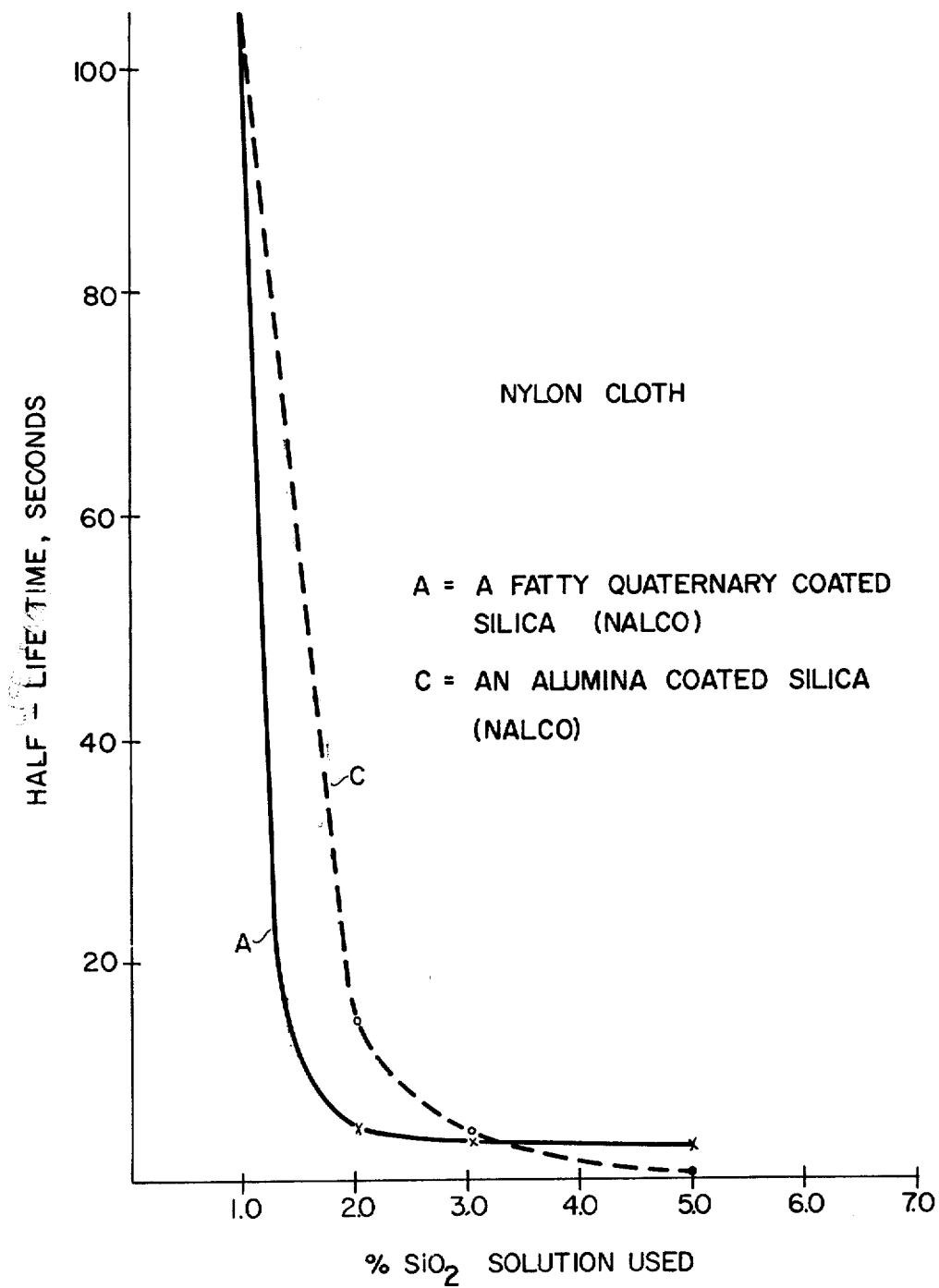

FABRIC FOR CARPET AND LIKE MATERIALS CONTAINING A COATING OF COLLOIDAL SILICA WITH A LAYER OF ALUMINA

The present invention is concerned with the utilization of a modified aquasol consisting of alumina coated silica applied to pile fabrics of carpets and like soft materials. The pertinent prior patent art relative to alumina coated silica is set out below:

U.S. Pat. No. 2,892,797—Alexander et al (duPont)
U.S. Pat. No. 3,007,878—Alexander et al (duPont)
U.S. Pat. No. 3,719,607—Moore (duPont)

The Alexander et al patents relate to methods of coating silica sol with alumina and utilizing as a starting material an alkali stabilized silica sol.

U.S. Pat. No. 3,139,406—Mindick et al (Nalco)
U.S. Pat. No. 3,252,917—Mindick et al (Nalco)

The Mindick et al patents utilizing acid stabilized silica sol react with aluminum halide. Mindick '406 uses sequential anion exchange resin treatment which in '917 is simplified to a one pass anion exchange resin.

U.S. Pat. No. 2,928,754—Schappel (American Viscose)
U.S. Pat. No. 2,999,774—Schappel (American Viscose)

Both of these patents relate to carpet treatment with silica.

With respect to treating pile fabric, U.S. Pat. No. 2,622,307 Cogovan et al (Mohawk Carpet) is of interest.

U.S Pat. No. 3,033,699 Aarons et al (duPont) is specially of interest with respect to pile fabric and carpets by treatment with a combination of silica and clay which functions as a combined antistatic and antisoil treatment.

In the literature, R. K. Iler, *The Colloid Chemistry of Silica and Silicates*, Cornell Press, 1955, at page 111, teaches the reversal of charge on silica by aluminum and stabilizing dilute silica sol by aluminum salts.

THE STARTING AQUEOUS SILICA SOLS

Generally, any aqueous silica sol can be used for this invention. These are well known to the art. The starting aqueous silica sol can range from 3 to 50% by weight of discrete, dense colloidal particles of amorphous silica as the dispersed phase. The average particle diameter can range from 3 to 100 millimicrons and can have an average surface area from 20 $M^2/g$ to 1,000 $M^2/g$. It is preferred that the starting aqueous silica sol be from 30 to 50% by weight of discrete, dense colloidal particles of amorphous silica. The preferred particle diameter should range from 8 to 30 millimicrons and have an average surface area from 135 to 190 $M^2/g$. Sufficient aluminum salt solution is utilized to uniformly coat the silica particles with alumina to yield a coated sol product having an alumina/silica ratio ranging from 0.1 to 1.0. The preferred range is 8–30 millimicrons with an alumina:silica ratio of 0.13 to 0.5. The product which is preferred is 20 millimicrons, containing 30% solids [the total of silica (25%) plus the alumina (5%)] has an alumina:silica ratio of 0.2.

Preferred silica sols are those wherein the reactant silica sol has been acid stabilized and specially preferred silica sols are those set out and described in U.S. Pat. No. 3,139,406 of Mindick et al and U.S. Pat. No. 3,252,917 of Mindick et al. In Mindick U.S. Pat. No. 3,139,406, a mixture of trivalent aluminum halide such as aluminum chloride is mixed with a colloidal silica sol. The coating of alumina on the silica particles is made following the teachings in the Mindick et al patents above. In Mindick U.S. Pat. No. 3,139,406 a mixture of aluminum halide such as aluminum chloride is mixed with colloidal silica sol which has preferably been acid stabilized in a pretreatment process. The mixture is sequentially contacted with an anion exchanger and heated at least twice. The Mindick et al U.S. Pat. No. 3,252,917 utilizes a single pass anion exchanger to effect the desired coating. The utilization of acid stabilized silica sols enables the use of the resultant alumina coated silica in higher pH's of 4.5 to 6.5, which is of industrial worth. Specific examples incorporated by reference in Mindick et al U.S. Pat. No. 3,139,406 and made a part of this invention are: Examples II, III, IV, VI, VII and VIII. The weight ratios of the starting reactants are adjusted so that the weight ratio of $Al_2O_3$ to $SiO_2$ in the solution range from about 0.2:1. Where alumina halide is utilized in the description of this invention, it includes chlorides, bromides, and iodides.

The following is a table of commercially available aqueous silica sols. These are sold by Nalco Chemical Company under the Trademark Nalcoags.

It is preferred but not essential that the starting aqueous silica sols used in this procedure be double deionized by any of the well-known techniques.

A preferred starting silica sol for purposes of the present invention is that denoted as Nalcoag 1034A, an acid stabilized and double deionized sol, containing 34% colloidal silica calculated as $SiO_2$. Typically, Nalcoag 1034A contains less than 600 ppm of sodium, $Na^+$, calculated as $Na_2O$, and 180 ppm of chloride, $Cl^-$, as combined chloride and sulfate. In utilizing commercial silica sols, effort was made to start with a relative concentration of $SiO_2:Na_2O$ of greater than about 200/1.

TABLE I

| Nalcoag | 1030 | 1034A | 1035 | 1050 | 1060 | 1130 | 1140 |
|---|---|---|---|---|---|---|---|
| Percent colloidal silica, as $SiO_2$ | 30 | 34 | 35 | 50 | 50 | 30 | 40 |
| pH | 10.2 | 3.1 | 8.6 | 9.0 | 8.5 | 10 | 10 |
| Average particle size, millimicrons | 11–16 | 16–22 | 16–22 | 17–25 | 40–60 | 8 | 15 |
| Average surface area, $M^2$/gram | 190–270 | 135–190 | 135–190 | 120–176 | 50–75 | 375 | 200 |
| Specific gravity at 68° F. | 1.205 | 1.230 | 1.255 | 1.385 | 1.390 | 1.214 | 1.296 |
| Viscosity at 77° F. c.p.s. | 5* | 5* | 5 | 70* | 5–10 | 7 | 8 |
| $Na_2O$, percent | 0.40 | 0.06 | 0.10 | 0.30 | 0.10 | 0.65 | 0.40 |

*Less than

The application of the present invention is more particularly adapted to so-called soft materials which include carpets, wall coverings, draperies, doormats, car interiors and upholstery, because in this instance both the antistatic and antisoil functions of the treating agent are brought into play. Thus, this invention is particularly adapted to carpet treating to prevent electrostatic shock as well as to remove surface soil from the carpet.

THE METHOD OF TREATING SOFT MATERIALS

Usually, a spray technique on smaller articles is utilized and in some cases a dip technique for coating is used.

The present invention uniquely combines a silica fraction acting mainly as an antisoil agent and an alumina fraction acting mainly as an antistatic agent. The application of the alumina coated silica compounds of the present invention to pile fabric and carpets and like material is usually in the nature of 1–4% by added weight based upon the percent of silica as $SiO_2$ added to the dry weight of the pile. Less than about 1% or in some cases .5% gives lack of treating effect and above 4% produces a white dust on the carpet or pile fabric.

In the past, it has been found that quaternary compounds and many other organic compounds commercially used as antistatic agents present a very bad soiling problem and, in fact, are presoil agents. However, the present compounds can be viewed as both antistatic and antisoil treating preparations for these soft materials. The amount of coating or treating agent is similar to the prior art, for example, U.S. Pat. No. 2,622,307 to Cogovan (Mohawk) at column 4, lines 33–49, when referring to the coating of colloidal silica on pile yarns. The combination of antistatic and soil-resistant components is also noted in the prior art in U.S. Pat. No. 3,033,699 to Aarons et al. (duPont), which utilizes a combination of clay and colloidal silica sol and in that patent also is utilized the soil testing using Sanders and Lambert's synthetic soil at Example I and Column 4.

FIG. 1 represents results from antistat tests at different percentages of silica where the half-life time expressed in seconds was measured according to the procedure of Example II.

In the following experimental procedures, the antistatic effect is due mainly to the alumina component and is measured and observed on fabric samples treated by dip methods. The antisoil effect is due mainly to the silica component and is measured on samples treated by spraying.

EXAMPLE I — Preparation of Alumina Coated Aquasol

The alumina coated silica sols of the present invention are prepared conveniently using the prior art method of Mindick et al as set forth in U.S. Pat. No. 3,252,917, where an acid silica sol is reacted with an aluminum halide in the presence of an anion exchange resin where the anion is a weak volatile inorganic acid. Exemplary of such a preparation useful in the present invention is the following:

58 pounds of deionized water were mixed with 27 pounds of $Al_2(OH)_5Cl$ which was calculated to be equivalent to 6.2 pounds of $Al_2O_3$. 93 pounds of the acid silica sol produced through a double deionization procedure were added to the above basic aluminum halide with rapid stirring. Upon complete mixture, the pH was 3.7 and the specific conductance 17,000. This mixture was then heated for 1 hour at 180°–188°F., and allowed to cool to 77°F. After this heat treatment, the pH was 2.9 and the specific conductance was 23,500. To this mixture was then gradually added 39.4 pounds of resin. The contents of the reaction vessel including the resin were emptied into a filtration unit and rinse water then applied to the resin bed. The filtered sol product weighing 190 pounds had a specific gravity of 1.145. The product was analyzed and found to contain 19.8% solids. The ratio of $Al_2O_3/SiO_2$ was 0.22. The conductance was 3250; the pH was 5.5; and the viscosity was 4.1 cps.

A portion of the above alumina-coated silica sol was concentrated by heating on a steam bath at around 200°F. with stirring. The slightly viscous solid was concentrated to a solids content of 29.5% and maintained the same $Al_2O_3/SiO_2$ ratio of 0.22. The pH was 5.0 and the specific conductance was 3900. The density of the sol was 1.227 and the viscosity was 49 cps. at 77°F. by Brookfield viscometer measurement.

In Example II, post, the static electricity tests were made using an alumina coated silica sol prepared by Example I and designated as Product C. The silica sol utilized corresponded to 1034A (see also Table I).

Additional experiments or runs were made with Nalcoag 1035, a 35% non-deionized colloidal $SiO_2$, and the results were quite similar to those obtained utilizing the 34% deionized $SiO_2$ or Nalcoag 1034A above as used in Example II.

EXAMPLE II — Antistatic Properties

Static electricity tests were done on pieces of nylon cloth pre-prepared by washing with detergent for one cycle and then washing without detergent for one cycle before drying. The nylon cloth was then cut into 5 inch × 5 inch squares and immersed in the test solution, wrung out to 100% wet retention thus giving a carryover of 3.2% silica based on dry weight of the cloth, and dried at 120°C for 5 minutes. Static electricity tests were performed using the Stati-Tester, Model 169, from Most Associates, Inc., Marblehead, Massachusetts. A voltage of from 50–300 volts at 100 milliamps was applied to the nylon cloth. The initial voltage was measured and then the current shut off. The time required for the voltage to drop to half its initial value with no current applied was recorded as the half-life time. The shorter the time, the faster the charge dissipated from the cloth.

In the above, the alumina coated silica utilized was Product C and the original silica sol was 1034A.

Results of the tests are shown below in Table II.

TABLE II

Comparison of Product C vs. Other Commercial Antistat Formulations

Temp = 26°
RH = 8%

| Sample | Dilution | Initial Voltage | Half-Life Time |
|---|---|---|---|
| Control (Chicago tap water) | — | 205 | 10 mins. |
| Product A* | 1:8 | 180 | 1 sec. |
| Product C'+ | 1:8 | 210 | 1 sec. |
| Statico+ | 1:4 | 210 | 1 sec. |
| Bonds EHP26-12** | 1:26 | 80 | 0.5 sec. |

*Product A is a fatty quaternary silica manufactured by Nalco Chemical Company, Chicago, Illinois
**Bonds EHP26-12 manufactured by Bond Chemical Products, Chicago, Illinois +Statico manufactured by Walter Legge Company, Chicago, Illinois
'+Product C is an alumina coated silica manufactured according to the procedure of Example 9 of Patent 3,252,917 to Mindick et al.

EXAMPLE III — Antisoil Properties

Testing of Product C for antisoiling properties required formulating a synthetic dirt which would soil carpeting evenly. Following the recommendation of U.S. Pat. No. 3,033,699 to Aarons et al (duPont), a bulked Sanders & Lambert synthetic dirt was prepared. This dirt mixture is the "standard dirt" mixture used for antisoiling tests by industry and gives fairly reproducible results with even soilings.

90% nylon – 10% wool carpet samples were sprayed with test solutions to give a coverage of about 2% silica based on the weight of the pile of the rug. After drying, the test samples were placed along the wall of a quart metal can. About 800 one-eighth inch steel balls and 2.0g synthetic dirt were added to the can. The can was rotated on a set of rollers for one-half hour at 120 rpm. The carpet samples were then vacuumed and the brightness measured on a brightness meter made by Martin Sweets Company, Louisville, Kentucky.

EXAMPLE IV

Soiling characteristics of textile pile treated with Product C versus some selected commercial products are shown below in Table III:

TABLE III

Soiling Tests of Product C vs. Selected Commercial Products

| Sample | Dilution | Brightness | % of Original Brightness |
|---|---|---|---|
| Original Untreated & soiled | — | 24.9 | 100.0 |
|  | — | 14.2 | 57.0 |
| Product A | 1:8 | 15.0 | 60.2 |
| Product C | 1:8 | 15.5 | 62.2 |
| Statico⁺ | 1:4 | 11.9 | 47.8 |
| Bonds EHP26-12* | 1:26 | 10.5 | 42.2 |

⁺Statico manufactured by Walter Legge Co., Chicago, Illinois
*Bonds EHP26-12 manufactured by Bond Chemical Products, Chicago, Illinois
Both of the above compounds are fatty quaternary compounds.
Product A = quaternary coated silica manufactured by Nalco Chemical Company
Product C = alumina coated silica manufactured by Nalco Chemical Company according to the present invention.

The values above for the test show that Product C made according to the present invention show antisoil values equal to or better than comparable quarternary ammonium coated silica of competing products.

The embodiments of the invention in which an exclusive property or privilege is claimed are defined as follows:

1. A soft material consisting of at least one fabric of carpets, wall coverings, draperies or car interiors having improved antistat and antisoil characteristics obtained by applying from about .5 to 4% $SiO_2$ based on the dry weight of said fabric wherein said $SiO_2$ is in the form of a silica aquasol having a coating of alumina on each silica particle and where the ratio of alumina to silica is in the range of 0.1 to 1.0.

2. The soft material according to claim 1 wherein the alumina to silica ratio is about 0.2.

3. The soft material according to claim 1 wherein the silica sol contains about 25 to 50% by weight of amorphous silica, each particle having an effective particle diameter range from about 8–30 millimicrons and having an average surface area from about 135 to 190 $M^2/g$.

* * * * *